United States Patent Office 3,641,113
Patented Feb. 8, 1972

3,641,113
PROCESS FOR THE MANUFACTURE OF VINYL ACETATE
Hans Fernholz, Fischbach, Taunus, and Gunter Jacobsen, Frankfurt am Main, Germany, assignors to Farbwerke Hoechst Aktiengesellschaft vormals Meister Lucius & Bruning, Frankfurt am Main, Germany
No Drawing. Filed Jan. 29, 1968, Ser. No. 701,111
Claims priority, application Germany, Feb. 4, 1967, F 51,441
Int. Cl. C07c 67/04
U.S. Cl. 260—497 A                6 Claims

ABSTRACT OF THE DISCLOSURE

Preparation of vinyl acetate from ethylene, acetic acid and oxygen in the presence of palladium acetate in the liquid phase at 60 to 180° C. and 5 to 100 atmospheres pressure in the presence of 1 to 20 moles, calculated on 1 gram atom of palladium, of a pyridine base.

---

The present invention relates to a process for the manufacture of vinyl acetate.

In the manufacture on an industrial scale of vinyl acetate in the liquid phase, an acetic solution containing alkali metal-, copper-, chloride- and acetate ions in addition to bivalent palladium is generally use das a medium. By introducing ethylene and oxygen into that solution, vinyl acetate and water are obtained in equimolar amounts and acetaldehyde is formed as a by-product.

In the said process the chloride ions are of decisive importance for the regeneration of the bivalent palladium. It is known, however, that such chloride-containing catalyst solutions give rise to corrosions and to a number of undesired side reactions, for example, dimerization of the ethylene to butenes and formation of chlorinated products and of difficulty soluble copper oxalate, so that losses in yield arise and the purification of the vinyl acetate as well as the regeneration of the catalyst solution, which is particularly important when the process is carried out continuously, are rendered difficult. The chloride consumed is continuously replaced in the form of hydrochloric acid. Moreover, carrying out the process in a continuous manner requires the continuous supply of palladium chloride and copper acetate.

According to another proposal, the process is performed in the absence of halogen ions. It has been proposed, for example, to use palladium black or metallic palladium supported on carriers in the presence of oxidation catalysts, e.g. manganese-, cobalt- or copper acetate. However, it is not possible under these conditions to work continuously because of the rapid ageing of the metallic palladium. A solution of the acetates of palladium, copper and lithium in acetic acid has only a temporary catalytic action. It has also been proposed to oxidize reduced liquid catalysts using peracetic acid or compounds of nitrogen and oxygen. According to another proposal, palladium salts, for example, palladium chloride or palladium acetate, are used, while the redox system is replaced by amines. As suitable amines there have generally been proposed the mono-, di- or polyamines of the aliphatic, cycloaliphatic, araliphatic, aromatic or heterocyclic series, for example, diethylamine, triethylamine, diisopropylamine, ethylenediamine, cyclohexylamine, benzylamine, piperidine, substituted piperidines, alkylpyrrolidines or piperazines. No mention has been made of the amounts to be used; it is evident from the pertinent examples that, besides palladium chloride, 6.5% triethylamine in glacial acetic acid is required. According to a further proposal, vinyl acetate is made from ethylene and acetic acid, using, in addition to palladium-, rhodium- or platinum halides or acetates, copper-, iron-, nickel-, chromium-, cobalt- or lead acetates or halides and, if desired, alkali metal- or alkaline earth metal halides or acetates, also aromatic secondary or tert. amines or the salts thereof, e.g. N-mono- or diethylaniline, diphenylamine, N-cyclohexyl-, N-(hydroxyethyl)- or N-(ethoxymethyl)-aniline, in an amount of 0.1 to 10% calculated on the noble or heavy metal catalysts. Finally, a process has been proposed for making esters of carboxylic acids with unsaturated alcohols by the reaction of carboxylic acids or compounds that can be converted to carboxylic acids under the reaction conditions, with olefinically mono- or polyunsaturated hydrocarbons in the presence of metal compounds forming complex or addition products with the olefinically unsaturated hydrocarbons, according to which process the reaction is carried out in the presence of molecular oxygen or gases containing oxygen and redox systems consisting of metal salts which reversibly change their valence stage under the reaction conditions or of autoxidizable ketones or quinones or the mixtures thereof. As reaction medium there may be used in this process, in addition to the carboxylic acid to be reacted, an inert solvent or a solvent having a particular polar effect. Among the appropriate solvents, e.g. benzonitrile, dimethylformamide and dimethyl sulfoxide, there have also been proposed amines, for example N-methylpyrrolidone and pyridine, which must be present, however, in large excess amounts to be effective as solvents.

Now we have found that vinyl acetate can be obtained from ethylene, acetic acid and oxygen in the presence of palladium acetate and, if desired, the acetate of a heavy metal occurring in several valence stages and/or an inert carrier material, in the liquid phase under pressures within the range of from 5 to 100 atmospheres, advantageously from 20 to 40 atmospheres, at temperatures within the range of from 60 to 180° C., advantageously from 100 to 150° C., by adding 1 to 20 moles, advantageously 2 to 8 moles, calculated on 1 gram atom of palladium, of a pyridine base. The process of the invention renounces the concomitant use of halides.

It has been found that the use of a pyridine base as solvent is disadvantageous since relatively large amounts of pyridine base hinder the formation of vinyl acetate, while small or catalytic amounts thereof favor the reaction since they improve the efficacy as well as the life of the catalyst. The pyridine or another pyridine base is therefore used in amounts of 1 to 20 moles, advantageously 2 to 8 moles, for each gram atom of palladium. The favorable effect obtained by this measure which is even enhanced in the presence of a heavy metal acetate, for example copper acetate, is evident from the examples given below. The metallic palladium formed in the formation of vinyl acetate is converted to palladium acetate by acetic acid and oxygen. The speed of this important reaction is, however, very low. In the presence of pyridine, the palladium is rapidly oxidized with the formation of a complex compound of palladium acetate and pyridine. This complex compound yields the palladium acetate necessary for the reaction, while giving off pyridine. An excess of pyridine leads to an increased formation of complex compound which, in turn, reduces the formation of vinyl acetate.

Of the pyridine bases, pyridine itself is particularly appropriate. It is also possible, however, to use, for example, quinoline, isoquinoline and dipyridyl.

There may also be used pyridine bases which are substituted by one or more low alkyl groups, for example, the various picolines, lutidines and collidines. Two of these alkyl groups may form a carbocyclic ring as is the case in tetrahydroquinoline and tetrahydroisoquinoline.

The reaction may also be carried out in the presence of an inert carrier material in a heterogeneous phase, whereby the yield is further increased. Examples of suitable carrier material are active carbon, pumice, aluminum oxide, aluminum silicate and silicic acid.

It is very advantageous to use a heavy metal acetate, for example, iron-, cobalt-, nickel- or manganese acetate. Preferably, copper acetate is used in an amount within the range of 1 to 100 moles for each gram atom of palladium.

The reaction is carried out in the liquid phase under pressures within the range of from 5 to 100 atmospheres, advantageously from 20 to 40 atmospheres, at temperatures within the range of from 60 to 180° C., advantageously from 100 to 150° C. The acetic acid is advantageously used in the form of glacial acetic acid. It is also possible, however, to use acetic acid having a water content of up to 50%. In the interests of safety, the ratio of ethylene to oxygen or air is chosen such that it is outside the explosive range of these mixtures.

The process may be carried out discontinuously in an autoclave. It is, however, preferably carried out continuously in a flow apparatus. One may proceed, for example, as follows: the catalyst which is dissolved or suspended in acetic acid is disposed in a sump phase, a mixture of ethylene and oxygen is passed through at high speed and then condensed, the gas is recycled after replacing the consumed starting substances and the consumed or entrained acetic acid is also replaced. When carrying out the process continuously it is advantageous to post-introduce small amounts of palladium in the form of acetate dissolved in acetic acid, since the activity of the catalyst cannot be maintained indefinitely. When the process is carried out in the absence of a carrier, the necessary regeneration can be performed in a particularly simple manner. During working, a part of the solid constituents can be drawn off continuously or discontinuously by known measures, for example heating in glacial acetic acid with an equivalent amount of nitric acid, and can then be reconverted to palladium acetate and returned to the reaction.

The process in accordance with the invention has various advantages over the known process using chlorides. As material for the apparatus it is sufficient to use stainless steel. No chlorinated by-products are formed. No losses of copper due to the formation of copper oxalate arise. No butenes are formed as dimerization products of ethylene. Hence, the yield calculated on the ethylene used is increased. The pyridine base added in small amounts is not consumed, nor is it entrained by the reaction products and excess amounts of acetic acid when the process is carried out in the sump phase so that the pyridine base need only be added once.

The following examples serve to illustrate the invention, but are not intended to limit it.

EXAMPLES 1–17

The tests indicated in the following table were carried out in a 1-liter autoclave of stainless steel with electric heating and shaking means. To compare the efficacy of the different catalysts the rest of the test conditions were kept constant. In each test, 200 grams of glacial acetic acid, 0.16 gram of palladium acetate and the additives indicated in the table were introduced, ethylene and air were introduced at 30 atmospheres each and the mixture was heated to 150° C., while shaking, which took about 1½ hours. The autoclave was then allowed to cool. The reaction mixture so obtained was examined for acetaldehyde and vinyl acetate by gas chromatography. The table indicates the amounts of vinyl acetate and acetaldehyde obtained in each case. The extent of conversion of the oxygen present in a deficiency is a measure of the catalytic effect.

TABLE

| No. | Additives | Vinyl acetate, in g. | Acetaldehyde, in g. | Extent of conversion of $O_2$ in percent |
|---|---|---|---|---|
| 1 | None | 0.4 | | 1.0 |
| 2 | 4.0 g. $Cu(OCOCH_3)_2 \cdot H_2O$ | 3.5 | 0.2 | 10.1 |
| 3 | 0.26 g. pyridine | 7.2 | 0.3 | 21.2 |
| 4 | 4.0 g. $Cu(OCOCH_3)_2 \cdot H_2O$; 0.26 g. pyridine. | 12.4 | 0.7 | 35.8 |
| 5 | 4.0 g. $Cu(OCOCH_3)_2 \cdot H_2O$; 10 g. pyridine. | 0.4 | | 1.0 |
| 6 | 4.0 g. $Cu(OCOCH_3)_2 \cdot H_2O$; 15 g. active carbon. | 13.5 | 1.1 | 40.7 |
| 7 | 4.0 g. $Cu(OCOCH_3)_2 \cdot H_2O$; 15 g. active carbon; 0.1 g. pyridine. | 17.6 | 1.0 | 50.8 |
| 8 | 4.9 g. $Fe(OCOCH_3)_2 \cdot 4H_2O$; 15 g. active carbon. | 3.7 | 0.1 | 10.1 |
| 9 | 4.9 g. $Fe(OCOCH_3)_2 \cdot 4H_2O$; 15 g. active carbon; 0.1 g. pyridine. | 6.3 | 0.2 | 17.4 |
| 10 | 5.2 g. $Co(OCOCH_3)_2 \cdot 4H_2O$; 15 g. active carbon. | 5.1 | 0.3 | 14.8 |
| 11 | 5.2 g. $Co(OCOCH_3)_2 \cdot 4H_2O$; 15 g. active carbon; 0.1 g. pyridine. | 8.7 | 0.6 | 25.7 |
| 12 | 5.2 g. $Ni(OCOCH_3)_2 \cdot 4H_2O$; 15 g. active carbon. | 4.5 | 0.1 | 12.2 |
| 13 | 5.2 g. $Ni(OCOCH_3)_2 \cdot 4H_2O$; 15 g. active carbon; 0.1 g. pyridine. | 7.8 | 0.3 | 21.5 |
| 14 | 5.1 g. $Mn(OCOCH_3)_2 \cdot 4H_2O$; 15 g. active carbon. | 5.7 | 0.2 | 15.8 |
| 15 | 5.1 g. $Mn(OCOCH_3)_2 \cdot 4H_2O$; 15 g. active carbon; 0.1 g. pyridine. | 10.3 | 0.4 | 28.8 |
| 16 | 15 g. active carbon | 2.0 | 0.1 | 5.7 |
| 17 | 15 g. active carbon; 0.1 g. pyridine. | 6.5 | 0.2 | 17.9 |

EXAMPLE 18

For carrying out the reaction in a continuous manner there was used a vertically arranged jacketed reaction tube, about one third of which was filled with a solution containing 1.0 gram of palladium acetate, 19.0 grams of copper acetate and 2.0 grams of pyridine per liter of acetic acid. A mixture of ethylene and oxygen was passed upwards through the reactor at such a speed that the gassing density was about 100 working m.³ per m.² of cross-section and per hour. The temperature of the reaction mixture was kept at 120° C. by oil circulation heating. The gas mixture was cooled after having passed through the reactor and the condensate so obtained, consisting of acetic acid, water, vinyl acetate and acetaldehyde, was removed. The pressure in the plant was 30 atmospheres. The gas mixture was used again for the reaction, i.e. it was recycled, after the consumed proportions of ethylene and oxygen had been replaced, the oxygen content of the gas mixture having been adjusted to 4% after the gas mixture had left the reactor. The liquid level in the reactor was maintained by introducing acetic acid containing, per liter, 0.5 gram of dissolved palladium acetate.

The reaction products were obtained from the condensate by distillation. The space-time yields were 80 grams of vinyl acetate and 10 grams of acetaldehyde per liter of catalyst solution and per hour.

What is claimed is:
1. In a liquid phase process for the manufacture of vinyl acetate from ethylene, acetic acid and oxygen in the presence of palladium acetate and under pressures of 5 to 100 atmospheres and temperatures of 60 to 180° C., the improvement which comprises: adding 1 to 20 moles per gram atom of palladium of a compound selected from the group consisting of pyridine, quinoline, isoquinoline, dipyridyl, or any of said foregoing compounds having substituted therein an alkyl group having 1 to 4 carbon atoms, or any of said alkyl substituted compounds wherein said alkyl substituent is in the form of an isocyclic ring.

2. The process of claim 1 wherein the reaction is carried out in the presence of an inert carrier suspended in the liquid phase.

3. The process of claim 1 wherein 2 to 8 moles of pyridine base, calculated on 1 gram atom of palladium, are used.

4. The process of claim 1 wherein the reaction is carried out in the presence of a metal acetate selected from the group consisting of manganese, copper, iron, cobalt, and nickel acetate.

5. The process of claim 1 wherein pressures within the range of from 20 to 40 atmospheres are used.

6. The process of claim 1 wherein temperatures within the range of from 100 to 150° C. are used.

References Cited

UNITED STATES PATENTS 3,417,133   12/1968   Harris _____ 260—497

FOREIGN PATENTS 615,596   9/1962   Belgium _____ 260—497

LORRAINE A. WEINBERGER, Primary Examiner

R. D. KELLY, Assistant Examiner